United States Patent
Joußen et al.

(10) Patent No.: US 10,482,296 B1
(45) Date of Patent: Nov. 19, 2019

(54) HANDHELD CODE READER HAVING A MOTION SENSOR

(71) Applicant: COGNEX CORPORATION, Natick, MA (US)

(72) Inventors: Mario Joußen, Wollersheim (DE); Jörg Kesten, Merzenich (DE); Laurens Nunnink, Simpelveld (NL)

(73) Assignee: COGNEX CORPORATION, Natick, MA (US)

( * ) Notice: Subject to any disclaimer, the term of this patent is extended or adjusted under 35 U.S.C. 154(b) by 0 days.

(21) Appl. No.: 16/122,133

(22) Filed: Sep. 5, 2018

Related U.S. Application Data

(60) Division of application No. 13/925,366, filed on Jun. 24, 2013, now Pat. No. 10,127,422, which is a continuation-in-part of application No. 12/894,949, filed on Sep. 30, 2010, now Pat. No. 8,469,276, which is a continuation of application No. 11/962,339, filed on Dec. 21, 2007, now Pat. No. 7,857,218.

(51) Int. Cl.
  *G06K 7/10* (2006.01)
(52) U.S. Cl.
  CPC .................. *G06K 7/10881* (2013.01)
(58) Field of Classification Search
  CPC ........... G06K 7/10881; H04N 5/23251; H04N 5/23258; H04N 5/23248
  See application file for complete search history.

(56) References Cited

U.S. PATENT DOCUMENTS

| | | |
|---|---|---|
| 4,877,949 A | 10/1989 | Danielson et al. |
| 5,268,564 A | 12/1993 | Metlitsky et al. |
| 5,315,097 A | 5/1994 | Collins, Jr. et al. |
| 5,534,684 A | 7/1996 | Danielson |
| 5,536,930 A | 7/1996 | Barkan et al. |
| 5,656,804 A | 8/1997 | Barkan et al. |
| 5,656,805 A | 8/1997 | Plesko |
| 5,736,725 A | 4/1998 | Danielson |
| 6,186,400 B1 | 2/2001 | Dvorkis et al. |
| 6,201,554 B1 | 3/2001 | Lands |
| 6,223,988 B1 | 5/2001 | Batterman et al. |
| 6,243,503 B1 | 6/2001 | Teufel et al. |
| 6,575,368 B1 | 6/2003 | Tamburrini et al. |
| 6,648,228 B2 | 11/2003 | Dvorkis |

(Continued)

OTHER PUBLICATIONS

"Darkroom" Application Description. 2013. https://itunes.apple.com/us/app/darkroom/id298256007, 2 pages.

*Primary Examiner* — Laura A Gudorf
(74) *Attorney, Agent, or Firm* — Quarles & Brady LLP

(57) ABSTRACT

A code reader includes an image acquisition system to acquire a plurality of images. A sensor detects motion of the code reader, and a processor is operatively coupled to the image acquisition system and the sensor. The processor performs a plurality of steps including associating a first detected motion data with one of the plurality of acquired images; associating a second detected motion data with a subsequent one of the plurality of acquired images; attempting to decode the one of the plurality of acquired images; determining if the second detected motion data is preferred over the first detected motion data; and attempting to decode the subsequent one of the plurality of acquired images when the second detected motion data is preferred over the first detected motion data.

20 Claims, 8 Drawing Sheets

(56) References Cited

U.S. PATENT DOCUMENTS

| | | |
|---|---|---|
| 7,857,218 B2 | 12/2010 | Nunnink |
| 7,982,770 B1 | 7/2011 | Kahn et al. |
| 8,056,808 B2 | 11/2011 | Epshteyn |
| 8,322,622 B2 | 12/2012 | Liu |
| 8,371,505 B1 | 2/2013 | Zolotov |
| 8,469,276 B1 | 6/2013 | Nunnink |
| 10,127,422 B1 | 11/2018 | Jouβen et al. |
| 2004/0130628 A1 | 7/2004 | Stavely |
| 2005/0150959 A1 | 7/2005 | Izzo et al. |
| 2005/0173534 A1 | 8/2005 | Hepworth et al. |
| 2005/0236488 A1 | 10/2005 | Kricorissian |
| 2006/0081712 A1 | 4/2006 | Rudeen et al. |
| 2006/0081771 A1 | 4/2006 | Eliad Wardimon |
| 2006/0131419 A1 | 6/2006 | Nunnink |
| 2006/0204232 A1 | 9/2006 | Weinberg et al. |
| 2007/0057067 A1 | 3/2007 | He |
| 2007/0131770 A1 | 6/2007 | Nunnink |
| 2007/0176898 A1 | 8/2007 | Suh |
| 2007/0291016 A1 | 12/2007 | Philipp |
| 2008/0231714 A1* | 9/2008 | Estevez .................. G03B 17/00 348/208.16 |
| 2009/0001170 A1 | 1/2009 | He |
| 2009/0001171 A1 | 1/2009 | Carlson et al. |
| 2010/0108769 A1 | 5/2010 | Wang et al. |
| 2011/0290889 A1 | 12/2011 | Tamburrini et al. |
| 2012/0224072 A1* | 9/2012 | Koo .......................... G06K 9/22 348/208.2 |

\* cited by examiner

HANDHELD CODE READER HAVING A MOTION SENSOR

CROSS-REFERENCE TO RELATED APPLICATIONS

This patent application is a divisional of co-pending U.S. patent application Ser. No. 13/925,366 filed Jun. 4, 2013, and entitled "Handheld Code Reader Having a Motion Sensor," which is a continuation-in-part of U.S. patent application Ser. No. 12/894,949, filed Sep. 30, 2010, and entitled "Handheld Code Reader Having a Motion Sensor," now U.S. Pat. No. 8,469,276, which is a continuation of U.S. patent application Ser. No. 11/962,339, filed Dec. 21, 2007, now U.S. Pat. No. 7,857,218 dated Dec. 28, 2010, and entitled "Handheld Code Reader Having a Motion Sensor," each of which are incorporated herein by reference.

STATEMENT REGARDING FEDERALLY SPONSORED RESEARCH OR DEVELOPMENT

Not applicable.

BACKGROUND OF THE TECHNOLOGY

The present technology relates to the field of symbol or mark readers used to read marks (e.g., bar codes, etc.) directly on objects and more specifically to a reader that includes a motion sensor to provide enhanced reader functionality by adjusting reader operating characteristics based on sensed reader motion.

Mark or symbol reading entails the aiming of an image acquisition sensor (a CMOS camera, CCD, etc. contained within a reader) at a location on an object at which a symbol or mark has been applied, and acquiring an image of that mark. Each mark contains a set of predetermined patterns that represent an ordered group of characters or shapes that can be decoded by a processor to obtain useful information about the object (e.g. serial number, type, model, price, etc.).

During acquisition of an image of a mark, the type of illumination employed can directly affect the quality of the obtained image. For instance, where a mark is printed on a flat surface with contrasting ink or paint, high-angle "bright field" illumination often best illuminates mark features. By high-angle it is meant, generally, that light strikes the surface on which the mark is applied nearly perpendicularly (normal) or at an angle that is typically no less than about 45 degrees from perpendicular (normal) to the surface. Such illumination is subject to substantial reflection back toward im imaging sensor.

As another instance, where a mark is applied on a more irregular surface or created by etching or peening a pattern directly on a surface, the use of highly reflective bright field illumination may not be optimal. A penned/etched surface has two-dimensional properties that tend to scatter bright field illumination, thereby affecting the quality of the acquired image. In these cases, marks are often best illuminated via dark field illumination directed at the surface on which a mark is applied at a relatively low angle (e.g., approximately 45 degrees or less). Using such low-angle dark field illumination, two-dimensional surface texture is contrasted more effectively (with indents appearing as bright spots and surroundings as shadows) for better image acquisition.

In other cases, diffuse direct illumination may be optimal for imaging purposes. Such illumination is typically produced using a direct-projected light source (e.g. from LEDs) passing through a diffuser to produce a desired illumination effect.

When attempting to read and decode various types of marks on parts or components, it may be desirable to initially try one illumination type, such as bright field illumination. If the mark is not able to be read using bright field illumination, the reader may obtain an image of the mark using a second type of illumination, a third type of illumination, and so on. Some code readers have a dial or switch that must be manually toggled to change illumination modes. Manually stepping through illumination types via a switch is cumbersome and typically increases the length of time needed to successfully read a mark. Attempts to solve this problem have been made by developing a reader that sequentially steps through illumination modes while acquiring images of a mark and attempting to decode the marks in the images. This is not an optimal solution, however, as this solution may increase the length of time before a code is successfully read and decoded and additional switches/dials increase reader costs.

Similarly, depending on the type of mark to be imaged and decoded, different decoding algorithms may be employed. In some cases a reader user may be able to manually select via a dial or the like which decoding algorithm to use. In other cases a reader may be programmed to step through a series of decoding algorithms in attempts to decode a mark. As in the case of different illumination settings, switching between different decoding algorithms can be cumbersome and additional dials or switches can increase costs appreciably.

Other problems with capturing high quality images of marks via a reader are related to reader movement during imaging. To this end, if a reader is moving while an image of a mark is being captured the image can be blurred which often renders the mark in the image unable to be decoded.

In addition, reader movement can increase auto-focus time required to, as the label implies, focus a reader lens assembly on a mark to be imaged. To this end, typical readers can obtain an image of a mark suitable for decoding when the distance between the reader and the mark is anywhere within a range of distances by changing a focal length of the reader's field of view. Here, for instance, if a reader is twenty inches from a surface on which a mark has been applied and is moved toward the mark, a reader processor may be programmed to recognize that the mark is out of focus and hunt for a lens setting that brings the mark back into focus. A typical hunting process may include driving the reader lenses to juxtapositions consistent with one end of the range of focus (i.e., twenty-five inch focus) and then acquiring mark images as the focal length of the field of view is altered until the mark is again in focus. While this solution works well in some applications, one drawback is that the focus settling time can be increased appreciably when the in focus hunting process initially progresses in the wrong direction. For instance, where a reader is moved toward a mark but the reader is programmed to increase the focal length of the field of view when a mark becomes unfocused, the hunting process starts hunting in the wrong direction and settling time (i.e., focusing time) is increased. Excess focus settling time and image capturing time is bothersome.

BRIEF SUMMARY OF THE TECHNOLOGY

The present technology overcomes the disadvantages of the prior art by providing an improved system and method for reading and decoding marks applied on the surface of an object. In an illustrative embodiment, a motion sensor coupled to a handheld code reader senses movement of the reader when moved by a user. This information is then used by the reader to adjust the necessary operating characteristics in order to provide improved code reading functionality such as selecting an exposure period and associated movement for imaging and controlling the direction of focus as a function of the direction of movement of the reader.

In another embodiment a reader may be provided where different operating characteristics may be selected by the user by simply moving the reader in a pre-specified movement pattern. For instance, where a reader has five different illumination modes, a reader may be able to cycle from one mode to the next in the series of five modes by rotating the reader about an imaging axis by at least 45° in the counterclockwise direction. As another example one of a plurality of decoding algorithms may be selectable in a similar fashion.

Consistent with the above, some embodiments include a method for use with a handheld code reader that has an operating characteristic that can have at least first and second different states, the method for switching between the different states of the operating characteristic, the method comprising the steps of specifying a circumstance set including at least one of reader orientation and a threshold movement level for the reader, monitoring at least one of movement and orientation of the reader, determining when the circumstance set occurs and changing the operating characteristic state when the circumstance set occurs, wherein the operating characteristic is one of an illumination mode and a code decoding algorithm.

In some embodiments the circumstance set includes a threshold movement level of the reader and the handheld code reader includes a movement axis, the movement detected including movement with respect to the movement axis. In some cases the movement detected includes rotation substantially about the movement axis. In some cases the code reader includes an image obtaining component that has a field of view (FOV) centered on the movement axis and the movement detected includes rotation substantially around the movement axis.

In some cases the threshold movement level specifies rotation substantially around the movement axis through a threshold rotation angle. In some cases the threshold rotation angle is between 45 degrees and 180 degrees. In some cases the code reader includes an image obtaining component that has a field of view (FOV) centered on an FOV axis, the movement detected includes rotation substantially about the movement axis and the movement axis is substantially parallel to the FOV axis.

In some embodiments the code reader movement is sensed by a motion sensor. In some cases the motion sensor is an accelerometer. In some cases the code reader includes a trigger member and the step of changing the operating characteristic state includes changing the state when the trigger member is activated and the detected reader movement exceeds the threshold movement level.

Other embodiments include a method for use with a handheld code reader to select at least one reader operating characteristic, the method comprising the steps of detecting movement of the handheld code reader and determining, based on the movement of the reader, an optimum setting for the at least one reader operating characteristic, wherein the at least one operating characteristic includes at least one of lens focus and exposure time.

In some cases the at least one reader operating characteristic is lens focus and the optimum setting for the at least one operating characteristic includes a lens focusing setting that is altered as the code reader is moved toward and away from a code to be read. In some cases the at least one reader operating characteristic is exposure time and the optimum setting reduces the exposure time as the degree of movement increases.

In some embodiments the sensing movement step further includes sensing the direction of movement of the reader.

Still other embodiments include an apparatus for use with a handheld code reader that has an operating characteristic that can have at least first and second different states, the apparatus for switching between the different states of the operating characteristic, the apparatus comprising a sensor for detecting at least one of movement of the handheld code reader and orientation of the reader, a comparator for comparing the at least one of detected reader movement and reader orientation to at least one of a threshold movement level and a specific orientation and determining at least one of when the detected reader movement exceeds the threshold movement level and the reader is oriented in the specific orientation and a characteristic selector for changing between the different states of the operating characteristic when the at least one of detected reader movement exceeds the threshold movement level and the reader is in the specific orientation, wherein the operating characteristic is one of an illumination mode and a code decoding setting.

In some cases the handheld code reader includes a movement axis and wherein the sensor detects movement with respect to the movement axis. In some cases the code reader includes an image obtaining component that has a field of view (FOV) centered on an FOV axis, the sensor detecting rotation substantially about the movement axis and the movement axis substantially parallel to the FOV axis.

Other embodiments include an apparatus for use with a handheld code reader to select at least one reader operating characteristic, the apparatus comprising a sensor for detecting movement of the handheld code reader, a processor for determining, based on the movement of the reader, an optimum setting for the at least one reader operating characteristic and a characteristic controller for selecting optimum characteristic settings for the code reader as a function of the reader movement, wherein the at least one operating characteristic includes at least one of lens focus and exposure time.

In some cases the at least one reader operating characteristic is exposure time and wherein the optimum setting reduces the exposure time as the degree of movement increases. In some cases the sensor further senses the direction of movement of the reader and the processor determines the optimum setting as a function of the direction in which the reader is moving. In some cases the method further includes the step of using the sensed direction of the reader movement to predict the direction in which lens focus is to be adjusted.

Yet other embodiments include a code reader that includes an image acquisition system to acquire a plurality of images. A sensor detects motion of the code reader, and a processor is operatively coupled to the image acquisition system and the sensor. The processor performs a plurality of steps including associating a first detected motion data with one of the plurality of acquired images; associating a second detected motion data with a subsequent one of the plurality of acquired images; attempting to decode the one of the plurality of acquired images; determining if the second detected motion data is preferred over the first detected motion data; and attempting to decode the subsequent one of the plurality of acquired images when the second detected motion data is preferred over the first detected motion data.

Still other embodiments include a code reader that includes an image acquisition system to acquire low resolution images and high resolution images, and to acquire a brightness level for at least one of the low resolution images and high resolution images. A sensor detects motion of the code reader, and a processor is operatively coupled to the image acquisition system and the sensor. The processor performs a plurality of steps including instructing the image acquisition system to acquire a first image at a first exposure time; determining if a brightness level of the first image at the first exposure time provides an acceptable exposure time for image decoding; determining if a motion level of the code reader is above or below a motion level threshold, the motion level threshold based on the acceptable exposure time; when the motion level of the code reader is below the motion level threshold, and when the exposure time provides the acceptable exposure time, determining if the first image is a low resolution image or a high resolution image; and if the first image is a high resolution image, attempting to decode the high resolution image.

And still other embodiments include a system that includes an image acquisition system to acquire a plurality of images. A sensor detects motion of the image acquisition system, and a processor operatively coupled to the image acquisition system and the sensor performs a plurality of steps including associating a first detected motion data with one of the plurality of acquired images; associating a subsequent detected motion data with a subsequent one of the plurality of acquired images; determining if image decoding is in progress on the one of the plurality of acquired images; if image decoding is in process, comparing the first detected motion data associated with the one of the plurality of acquired images to the subsequent detected motion data associated with the subsequent one of the plurality of acquired images to determine which image has a preferred motion score; and processing at least one of the plurality of acquired images.

To the accomplishment of the foregoing and related ends, the technology, then, comprises the features hereinafter fully described. The following description and the annexed drawings set forth in detail certain illustrative aspects of the technology. However, these aspects are indicative of but a few of the various ways in which the principles of the technology can be employed. Other aspects, advantages and novel features of the technology will become apparent from the following detailed description of the technology when considered in conjunction with the drawings.

DETAILED DESCRIPTION OF THE TECHNOLOGY

Figure 1:
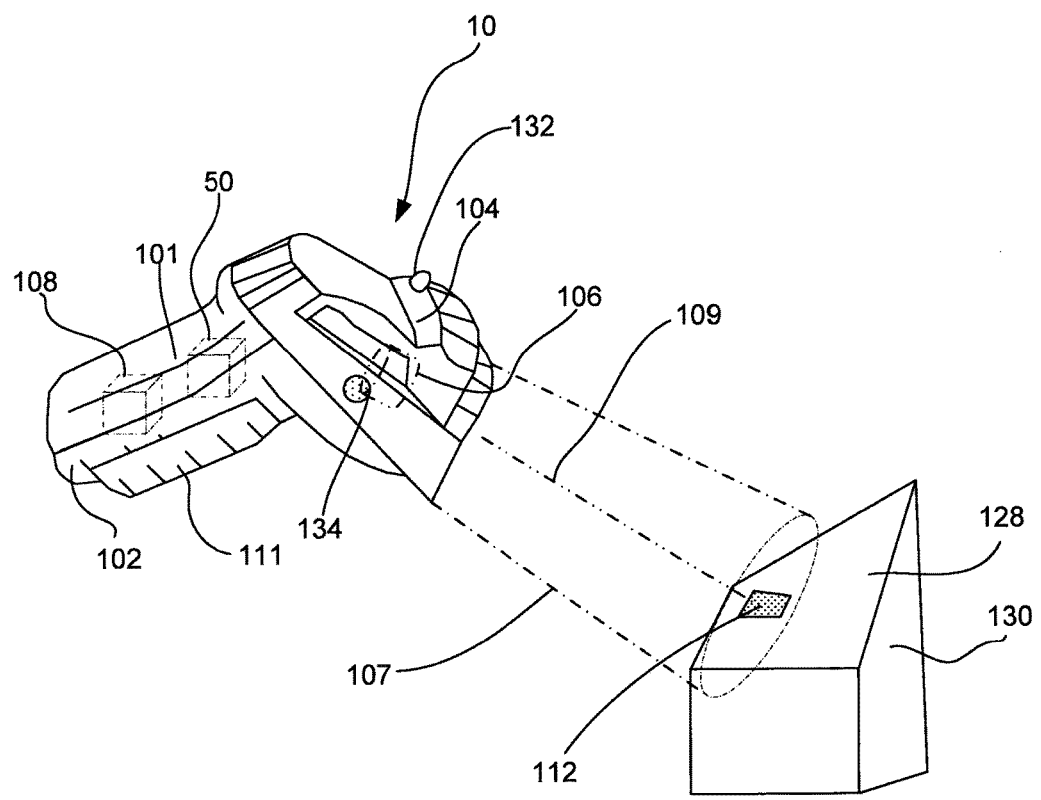
FIG. 1 is a perspective view of a handheld reader constructed in accordance with one aspect of the present technology.

Referring now to the drawings wherein like reference numerals correspond to similar elements throughout the several views and more specifically, referring to FIGS. 1 and 2, the present technology will be described in the context of an exemplary handheld symbol or mark reader 10 including a housing 101 having a grip section 102, a body/barrel section 104 and a trigger 111, a CCD or other type camera/sensor 105, optics/lenses 106, a motion sensor or accelerometer 50, a processor 108, one or more LEDs 132, a speaker/audio component 134, a battery 53, a memory 52 and a light source/subassembly 54. Each of the processor 108, sensor 50, battery 53, optics 106, memory 52 and light source 54 are mounted in or otherwise supported by housing 101. Processor 108 is linked to each of sensor 50, battery 53, memory 52, optics 106, camera/sensor 105, source 54, LEDs 132 and output 134. Processor 108 runs programs stored in memory 52 to perform inventive processes.

Optics 106 focus a field of view 107 on a CCD or other type of sensor device 105 within reader 10 which in turn generates data comprising a high resolution image of items located within the field of view 107. Field of view 107 is centered along a FOV axis 109. Thus, when the field of view 107 is directed toward a mark 112 applied on a surface 128 of an item 130 and reader 10 is activated to generate an image, an image including the mark 112 is obtained.

According to one aspect of the present technology, different reader 10 settings can be selected by a reader user by moving the reader 10 through a predefined movement or machination that is selected as an action that would not typically occur during normal reader operations. For example, a predefined machination may include rotation of reader 10 substantially about the field of view axis 109 through at least a threshold angle (e.g., between 45 degrees and 90 degrees) in a counter-clockwise direction. Another predefined machination may include a clockwise rotation quickly followed by a counter-clockwise rotation of some threshold angle. Other predefined machinations are contemplated.

With respect to settings that may be set in this manner, virtually any operating characteristic may be set including an illumination effect (dark field, light field, diffuse light, etc.), which decoding algorithm to choose to decode a mark to be imaged, combinations of illumination effect/decoding algorithms, etc. Hereinafter, the term "recipe" is used generally to refer to different sets of operating characteristics (e.g., illumination effect and decoding algorithm).

Referring again to FIGS. 1 and 2, when trigger 111 is activated, reader 10 obtains an image. After mark 112 has been imaged, processor 108 is programmed to decode the mark in the image. When a mark is successfully decoded, processor 108 may generate a signal via one of LEDs 132 or audio output 134 confirming a successful decoding process.

Figure 3:
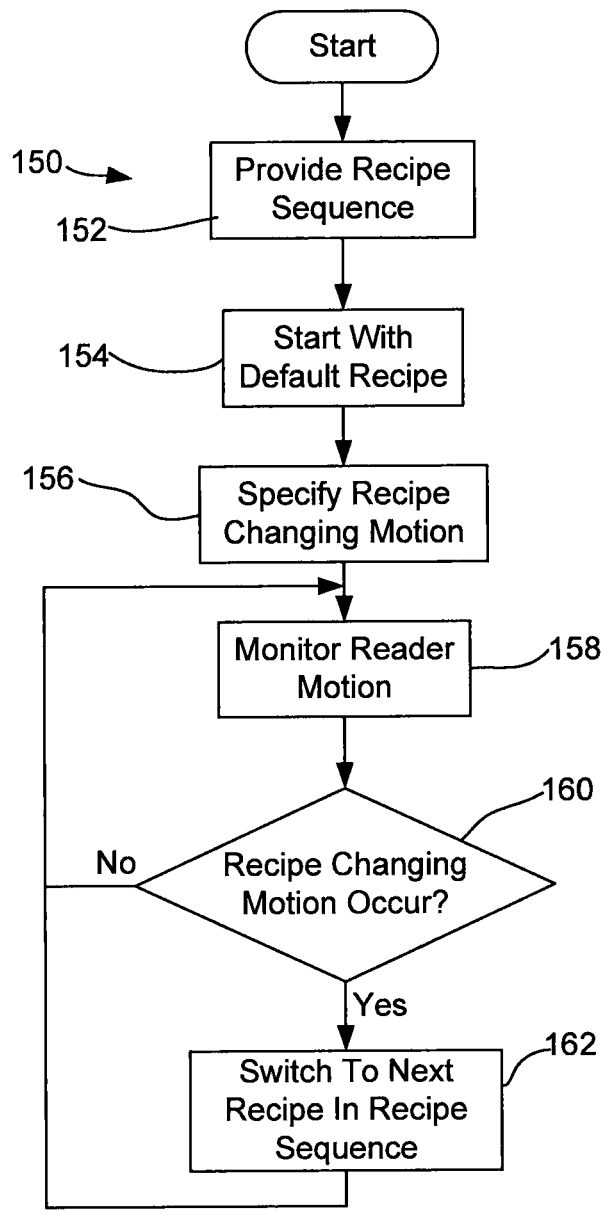
FIG. 3 is a flowchart illustrating a method wherein reader movement is used to alter reader operating characteristics.

Referring now to FIG. 3, a process 150 for changing a reader recipe via a predefined reader motion or machination is illustrated. Beginning at block 152, a recipe sequence is provided. Here, a recipe sequence means a sequence of operating characteristics or operating characteristic sets that should be cycled through when one of the predefined reader movements occurs. For example, one recipe sequence corresponding to illumination effect may cycle from dark field to light field to a diffused lighting effect and then back to dark field illumination. As another example, another recipe sequence corresponding to decoding algorithms may include a first decoding algorithm, followed by a second decoding algorithm, followed by a third decoding algorithm all the way through a tenth decoding algorithm and they may return back to the first decoding algorithm. As one other example, an illumination effect/decoding algorithm recipe sequence may start with a first recipe including dark field illumination and the first decoding algorithm followed by a second recipe including dark field illumination and a second decoding algorithm followed by light field illumination and the first decoding algorithm, and so on.

Referring still to FIG. 3, at block 154, when a reader 10 (see again FIG. 1) is initially turned on, the reader will start with a default recipe such as, for instance, the combination of dark field illumination and a first decoding algorithm. At block 156, the reader processor is initiated with a specific recipe changing motion. For example, an exemplary recipe changing motion may require rotation of the reader 10 about the field of view axis 109 through an angle of between 45° and 90° in the counter-clockwise direction.

Figure 2:
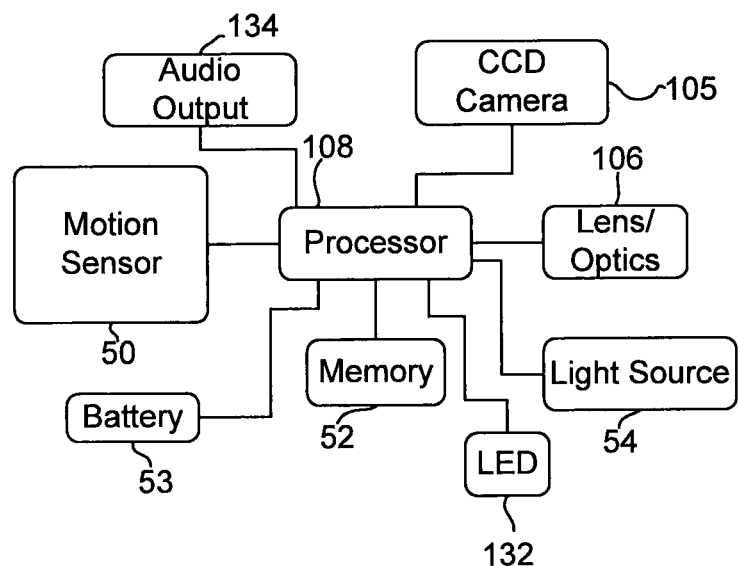
FIG. 2 is a schematic illustrating components of the reader of FIG. 1.

Referring still to FIGS. 1, 2 and 3, at block 158 reader motion is monitored. At block 160, reader motion is compared to the recipe changing motion that was specified at block 156. Where the reader motion corresponds to the recipe changing motion at block 160 control passes to block 162 where the processor 108 switches to the next recipe in the recipe sequence that was specified at block 152. After block 162, control passes back up to block 158 where reader motion is again monitored. In at least some applications when a recipe is altered via the prescribed machination, an LED 132 or the like may blink, illuminate, change color or otherwise visually signal to a user that a change has occurred.

Referring still to FIG. 3, at block 160, if reader motion does not correspond to the recipe changing motion, control passes back up to block 158 where reader motion is continually monitored. Thus, it should be appreciated that multiple recipe changing motions may occur one after another causing recipe changes corresponding to the sequence to occur for each one of the motions at block 162.

According to another aspect of the present technology, motion sensor 50 is used in conjunction with processor 108 to select and/or modify other reader 10 operating characteristics such as lens focus, exposure time, the image moment to optimize reader 10 operation, etc. For example, one problem with reader 10 that may be minimized by adjusting certain operating characteristics based on the sensed movement of reader 10 is motion blur. Motion blur may occur when reading very small codes, reading codes from large distances, or reading codes when the reader 10 is in motion. Motion blur can be especially problematic when a reader user has shaky hands due to the nature of an environment and the user cannot hold the reader 10 steady for even a short time period. According to one aspect of the present technology, processor 108 measures movement of the reader 10 and uses that information to minimize or even eliminate motion blur. For example, processor 108 may be programmed to use movement information to select an optimal setting for operating characteristics such as exposure time and image moment. For example, in a similar example, where an image is obtained over a one second period, time image data may be stored in one-tenth second intervals. Where no movement occurs over the entire second, all of the stored data may be used to generate the image for decoding. Where movement occurs, however, during the last half of the imaging second, the first half second of data may be used to generate the image for decoding. Here, the exposure time and movement would correspond to the first half of the data generating second. In another example, processor 108 does not acquire an image while the motion of reader 10 is above a certain threshold level of movement.

Figure 4:
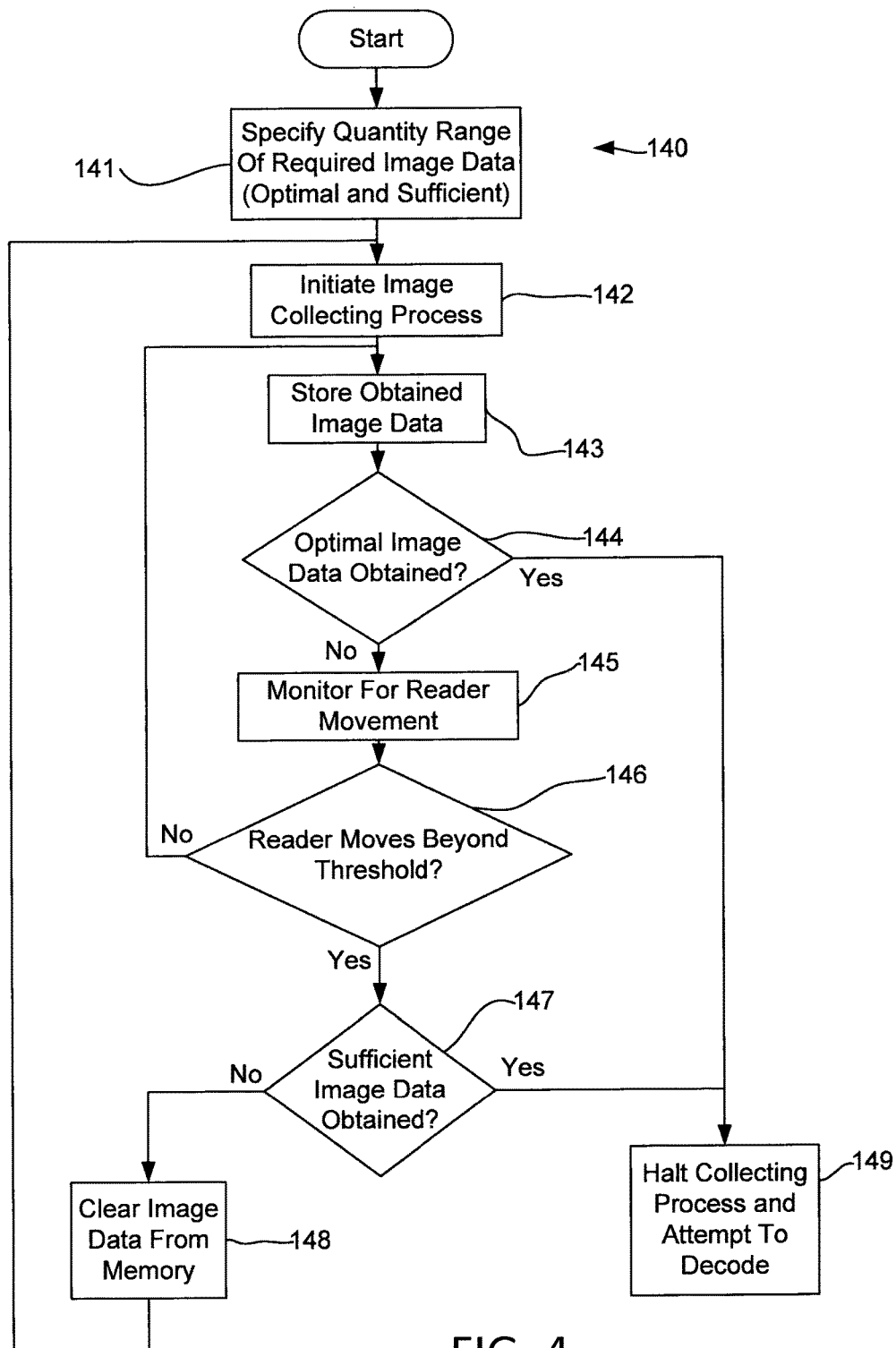
FIG. 4 is a flow chart illustrating a method whereby a reader automatically selects an exposure period and moment as a function of reader movement.

Referring now to FIG. 4, an exemplary method 140 for selecting an image moment and an exposure time as a function of reader movement is illustrated. Referring also to FIGS. 1 and 2, at block 141 a quantity range of required image data is specified for processor 108. Here, as known in the art, as camera exposure time is increased, the quantity of data collected by the reader camera increases. The greater the amount of data collected by a camera, typically, the better the resulting image. Thus, there is typically some optimal quantity of image data that should be collected to generate an image. However, there is also typically some quantity of data less than the optimal quantity that is usually sufficient for generating an image for decoding purposes. Here, at block 141 both the optimal and sufficient quantities of image data are specified for processor 108. At block 142, an image collecting process is initiated. Here, image collection initiation may comprise pointing the reader 10 so that the field of view 107 is directed at a mark to be imaged and depressing trigger 111.

Referring still to FIGS. 1, 2 and 4, at block 143 data collected by reader 10 is stored. At block 144, processor 108 determines whether or not the optimal amount of image data has been collected. This step 144 typically is time related. Where an optimal amount of data has been obtained, at block 144, control passes to block 149 where the data collecting process is halted and the processor 108 attempts to decode the imaged mark. Continuing, at block 144, where the optimal amount of image data has not yet been collected, control passes to block 145. At block 145, processor 108 monitors for reader movement. At block 146, where reader movement is less than a threshold level control passes back up to block 143 where image data continues to be stored. At block 146, where reader movement exceeds the threshold level, control passes to block 147.

Referring to FIG. 4, at block 147, processor 108 determines whether or not sufficient image data has already been obtained and stored. Where sufficient data for decoding purposes has been obtained and stored, control passes from block 147 to block 149 where the collecting process is halted and decoding is attempted. At block 147, where sufficient image data has not been obtained, control passes to block 148 where the image data is cleared from memory after which control passes back up to block 142 where the image collecting process is again initiated.

Thus, it should be appreciated that the method of FIG. 4 effectively selects the exposure time and the image moment for a reader as a function of reader movement.

In a similar fashion, in at least some embodiments where data must be collected for at least a minimum period, after the trigger is activated, movement may be monitored and data may be collected and stored to form an image during the first relatively stationary period that occurs after the triggering activity. Thus, for instance, where data has to be collected for at least one-half of one second to form a decodable image, after triggering, data may be collected until one-half second of data corresponding to a stationary reader has been obtained and then the one-half second of data corresponding to the stationary reader may be used to form an image for decoding.

According to another aspect of the present technology processor 108 may be programmed to use the movement as measured by motion sensor 50 in an auto-focus control algorithm. For example, if reader 10 is moving away from an object 130 to be scanned, the direction of the movement may be detected and used by processor 108 to adjust operating characteristics such as focal length of the field of view. Conversely, if reader 10 is moved towards an object 130 to be scanned, the movement direction may be detected and used by processor 108 to change the focus settings to shorten the focal length.

Figure 5:
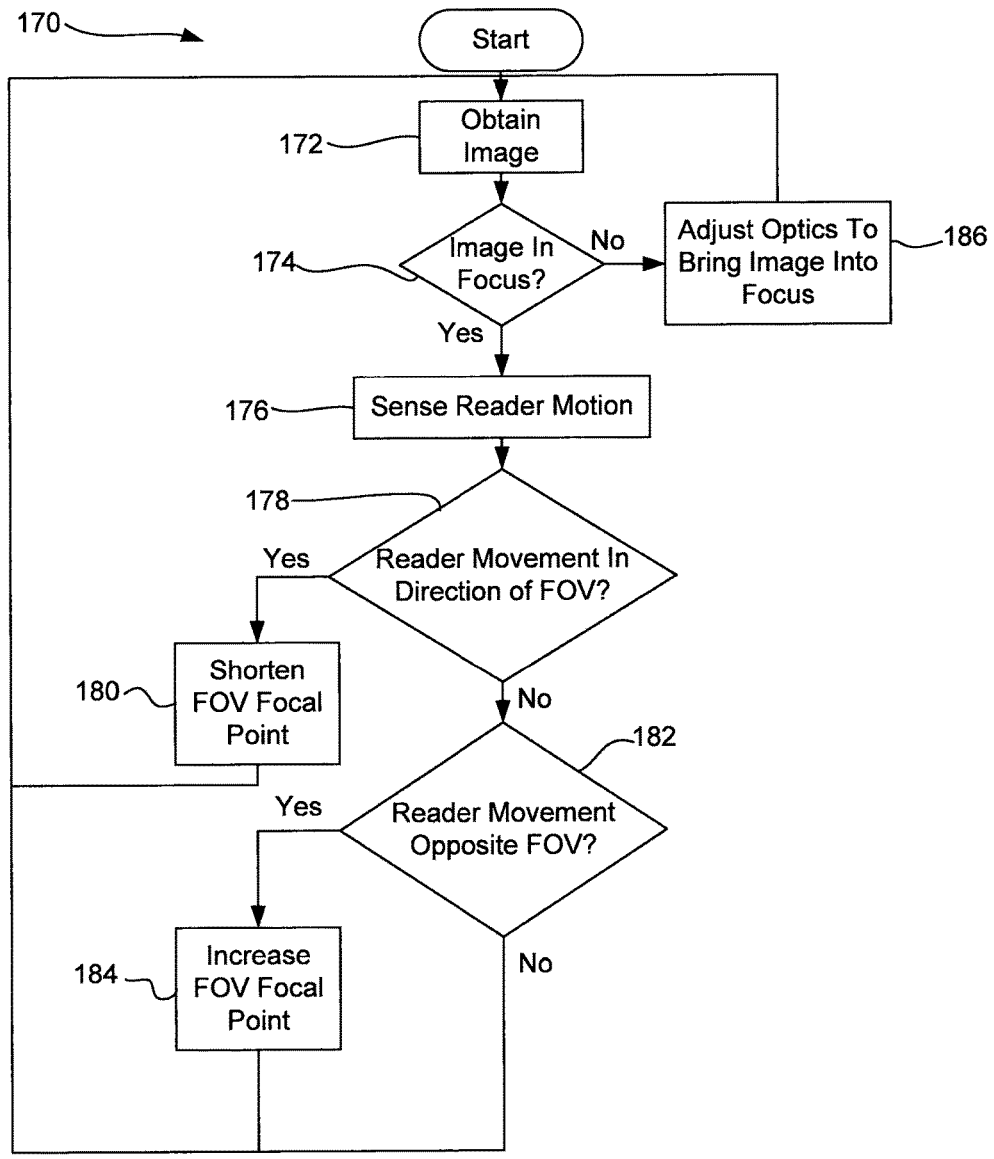
FIG. 5 is a flow chart illustrating a method whereby a reader automatically controls optics focus as a function of reader movement to expedite the settling time of the focusing process.

Referring now to FIG. 5, an exemplary method for adjusting reader focus as a function of the direction in which a reader is moved with respect to a mark being imaged is illustrated. Referring also to FIGS. 1 and 2, at block 172 the reader 10 is used to obtain an image. At block 174 processor 108 determines whether or not the obtained image is in focus using standard algorithms known in the art. At block 186, where the image is not in focus, processor 108 adjusts the optics/lens 106 at block 186 to bring the image into focus. Once the image is in focus, control passes from block 174 to block 176. At block 176, processor 108 senses reader motion via signals generated by accelerometer or motion sensor 50. At block 178, when processor 108 determines that the reader is moving in the direction of the reader's field of view (i.e., toward a mark being imaged) control passes to block 180 where processor 108 controls the optics/lens 106 to shorten the field of view focal point. After block 180 control passes back up to block 172 where another image of the mark is obtained and the process is repeated. Here, the focus hunting sub-processes at block 186 would be around a smaller window of possible focal points so that the hunting process would be expedited.

Referring still to FIGS. 1, 2 and 5, where reader movement is not in the direction of the field of view control passes to block 182. At block 182, where reader movement is in the direction opposite the field of view, control passes to block 184 where processor 108 lengthen the field of view focal point by adjusting the optics/lenses 106 after which control again passes back up to block 172 where the process continues. At block 182, where reader movement is not in the direction opposite the field of view, control simply passes back up to block 172 where another image is obtained.

Figure 6:
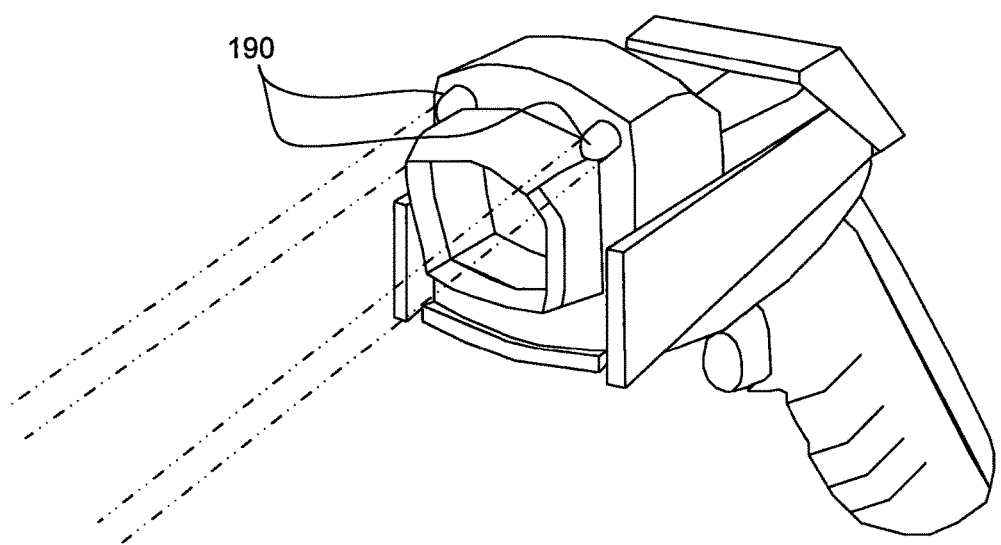
FIG. 6 is a perspective view of a reader that includes an aiming apparatus.

Referring to FIG. 6, according to another aspect of the present technology, a reader 10 may include a laser aimer 190 that is used to assist a user in placing a mark within the field of view of reader 10. Reader 10 power consumption can be reduced by turning off the laser aimer when not needed. An aimer can be turned off when reader 10 has not been in motion for a certain amount of time indicating that the reader is generally dormant. When reader 10 is picked up, this motion may be sensed and the laser aimer may be automatically turned back on. In the alternative, the laser aimer may remain off until the reader is picked up and moved and then held stationary for a short time consistent with a mark reading activity.

According to another aspect of the present technology, processor 108 may be programmed to first determine an acceptable exposure time for a particular image acquisition and/or imaging application. Then, the processor 108 can associate an acceptable level of reader motion for the acceptable exposure time. For example, an acceptable level of reader motion can be higher with a short exposure time, and conversely, an acceptable level of reader motion can be lower with a longer exposure time.

The exposure time can be manually determined or automatically determined with an auto exposure process. With an acceptable level of motion based on an acceptable exposure time for an image acquisition, the processor 108 can determine if the acquired image should be further processed, e.g., attempted to be decoded, or if the level of reader motion is so high that a successful decode is unlikely because of, for example, motion blur. The processor 108 is able to calculate the acceptable level of motion based on the automatically determined exposure time and only process images that are acceptable to process, i.e., the level of reader motion is at or less than a level of reader motion associated with a particular exposure time.

Figure 7:
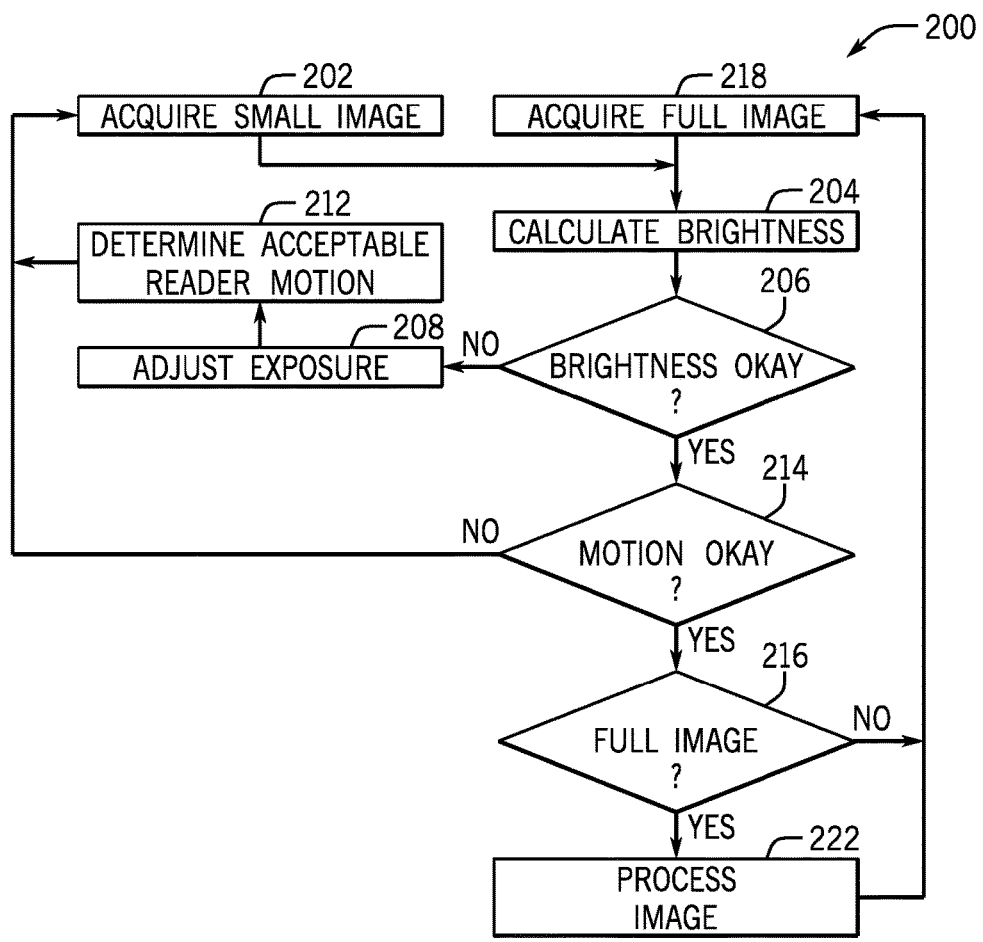
FIG. 7 is a flow chart illustrating a method for determining an acceptable exposure time for a particular image acquisition and/or imaging application and associating an acceptable level of reader motion for the acceptable exposure time.

Referring now to FIG. 7, an exemplary method 200 for determining an acceptable exposure time for a particular image acquisition and/or imaging application and associating an acceptable level of reader motion for the acceptable exposure time is illustrated. At block 202, the reader 10 can be used to obtain a small image to find an acceptable exposure time. In this context, a small image can refer to a low resolution image, i.e., less than a high resolution image. Obtaining small images can increase the frame rate, so as to decrease the time necessary to determine an acceptable exposure time. With an image acquired, the image brightness can be determined at block 204. At block 206, if the image brightness of the acquired image is not acceptable, the exposure time can be adjusted (increased or decreased) at block 208 and a new image can be acquired, back at block 202. This process of determining an acceptable exposure time can be repeated until the image brightness is determined to be acceptable, at block 206.

In series (or in parallel) to determining an acceptable exposure time, an acceptable level of reader motion can be determined, at block 212. This can be determined using a lookup table, for example. Alternatively, an acceptable level of reader motion can be determined based on a function or calculation using factors determined generally at the time of the calculation. An acceptable level of reader motion for a given exposure time can depend on one or more factors including the speed and direction of the reader motion, the focal length of the optics/lens 106 used, the distance to an object 130, and/or an amount of motion blur that is predetermined to be acceptable for the decoding algorithm used.

Once the image brightness is determined to be acceptable, at block 206, an acceptable level of reader motion for the current image can be determined, at block 212. If the level of reader motion during acquiring the current image is above a predetermined motion threshold, or outside of a predetermined motion threshold range, at block 214, the current image can be discarded, and a new image can be acquired, back at block 202. If the level of reader motion is at or below the predetermined motion threshold, or within the predetermined motion threshold range, the image can be processed.

In some embodiments, the processor 108, at block 216, can determine if the image is a full image. In this context, a full image can refer to a higher resolution image. If the image is not a full image, i.e., the image is a small image, a full image can be acquired at block 218. In some embodiments, brightness (block 206) and motion (block 214) can be checked again. If both the brightness and motion checks pass, the image can be further processed, e.g., attempted to be decoded, at block 222. If one or both of the brightness or motion check fails, the process can revert back to acquiring a small image, at block 202, and the process continues as described above.

It is to be appreciated that the method 200 can start with acquiring a full image, such as at block 218. Starting with a small image at block 202 can be incorporated to speed up the exposure adjustment process.

According to yet another aspect of the present technology, processor 108 may be programmed to acquire a plurality of images generally continuously, and prioritize one or more of the acquired images that were taken when the reader 10 was held more steadily. The acquired image associated with the least amount of motion, i.e., a motion score, can be prioritized first, and another image (not necessarily the next image) associated with a motion score greater than the first prioritized image can be prioritized second, and so on.

It is known that image processing typically takes more time than image acquisition. For example, in the time needed to fully process one image, multiple new images can be acquired. According to embodiments of the technology, images can be prioritized based on the sensed movement during acquisition of each image, or group of images. A maximum movement level for processing an image can be predetermined, and can generally be at the limits of what the image processing or decoding algorithms can compensate for.

Figure 8:
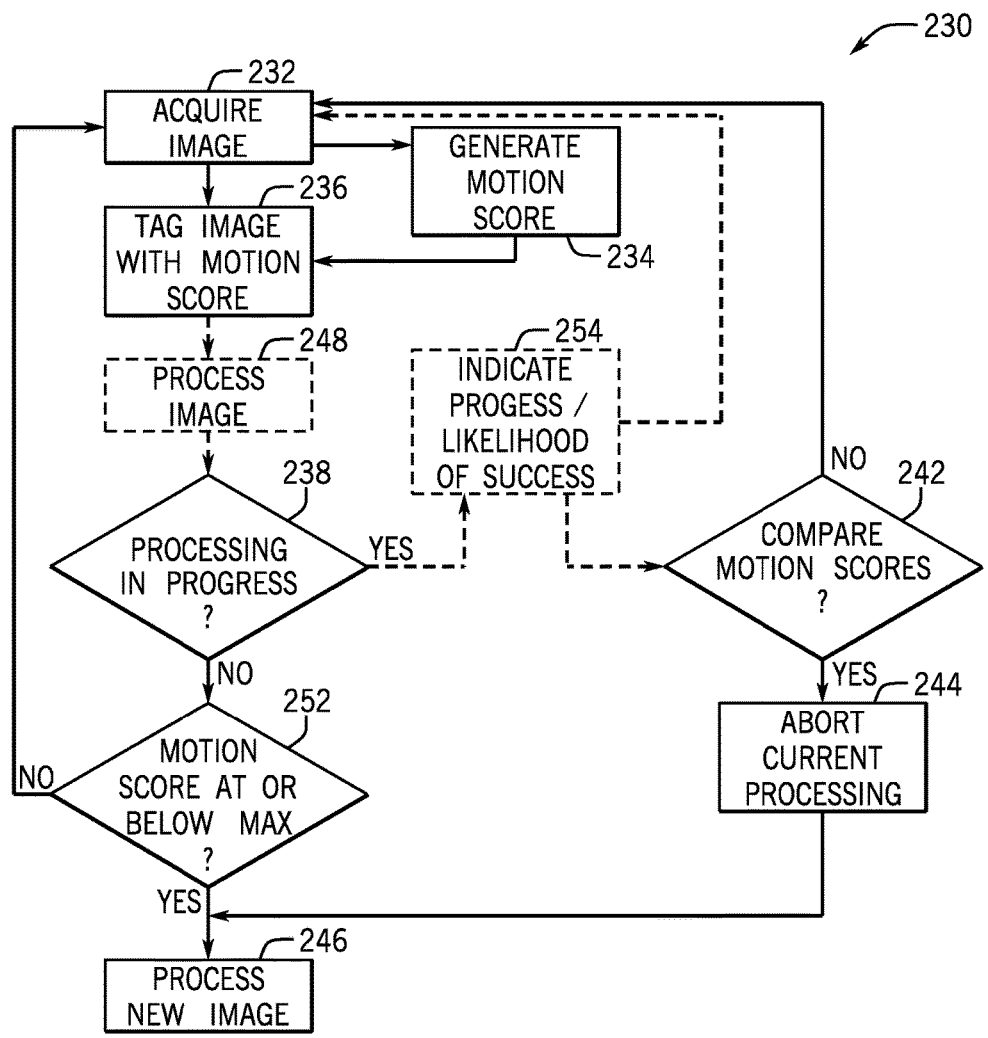
FIG. 8 is a flow chart illustrating a method for prioritizing and processing images based on a motion score.

Referring now to FIG. 8, an exemplary method 230 for prioritizing and processing images based on motion data, for example in the form of a motion score, is illustrated. At block 232, the reader 10 can be used to acquire a first image. In parallel, at block 234, the motion sensor 50 can generate a motion score for the first image, and at block 236, the first acquired image can be tagged, i.e., associated, with the motion score.

At block 238, processor 108 can determine if an image is currently being processed. At block 242, if an image is currently being processed, the processor 108 can compare the motion score of the image being processed to the motion score of the next image acquired to determine if the next image acquired has a preferred motion score, (i.e., a lower motion score, although a higher score may also be preferred), than the image currently being processed. When the next image acquired has a preferred motion score, processing of the image being processed can be aborted, at block 244, and processing can be started on the next image acquired, at block 246. The method 230 can continue to acquire additional images at block 232.

In some embodiments, at block 248, processing the first acquired image can start immediately after the image is acquired if the sensed motion score is at or below the maximum movement level. By immediately beginning to process the first acquired image, the time required to wait for the next acquired image can be utilized for image processing. This can be beneficial when the next image was acquired with a higher motion score than the first acquired image.

When image processing is not in progress, at block 252, the processor 108 can determine if the motion score of the acquired image is at or below the maximum movement level. If the motion score is at or below the maximum movement level, processing can be started on the acquired image, at block 246. The method 230 can continue to acquire images at block 232. If the motion score is not at or below the maximum movement level, a new image can be acquired at block 232.

In some embodiments, a minimal motion score delta can be defined to calculate when a new acquired image has better motion score than the current image being processed. As described above, the minimal motion score delta can be used to ensure that instead of first acquiring several images, and then choosing one with the best motion score, image processing can be started immediately on the first acquired image so the time to acquire more possibly better images is used for image processing.

In some embodiments, method 230 can include indicating a progress percentage or value and/or likelihood of successful processing at 254. The progress value or likelihood of a successful decode can be used to avoid discarding an image being processed that was close to completing a successful decode. Use of a progress percentage, for example, could be used with other image metrics as well, e.g., focus or brightness. As an example, it likely would be less preferred to abort processing of a sharp image with some motion blur in favor of a blurry image with little or no motion blur. It is to be appreciated that this may not always be the preferred action.

One or more specific embodiments of the present technology have been described above. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Thus, the technology is to cover all modifications, equivalents, and alternatives falling within the spirit and scope of the technology as defined by the following appended claims. As such, the following claims are made.

What is claimed is:

1. A code reader comprising:
an image acquisition system, the image acquisition system to acquire low resolution images and high resolution images, and to acquire a brightness level for at least one of the low resolution images and high resolution images;
a sensor to detect motion of the code reader;
a processor operatively coupled to the image acquisition system and the sensor, the processor to perform the steps of:
instructing the image acquisition system to acquire a first image at a first exposure time;
determining if a brightness level of the first image at the first exposure time provides an acceptable exposure time for image decoding;
determining if a motion level of the code reader is above or below a motion level threshold, the motion level threshold based on the acceptable exposure time;
when the motion level of the code reader is below the motion level threshold, and when the exposure time provides the acceptable exposure time, determining if the first image is a low resolution image or a high resolution image; and
if the first image is a high resolution image, attempting to decode the high resolution image.

2. The code reader of claim 1, further including, if the first image is a low resolution image, acquiring a new high resolution image.

3. The code reader of claim 2, further including when the motion level of the code reader is below the motion level threshold, and when the exposure time provides the acceptable exposure time, attempting to decode the high resolution image.

4. The code reader of claim 1, further including instructing the image acquisition system to acquire at least one high resolution image at the acceptable exposure time.

5. The code reader of claim 1, further including:
monitoring at least one of movement and orientation of the code reader; and
changing from a first recipe to a second recipe based on the at least one of movement and orientation of the reader.

6. The code reader of claim 1, further including:
instructing the image acquisition system to acquire a second image at a second exposure time; and
prioritizing the first image and the second image based on the motion level of the code reader during acquiring the first image and the motion level of the code reader during acquiring the second image.

7. The code reader of claim 1, further including if the brightness level of the first image at the first exposure time does not provide the acceptable exposure time for image decoding, acquiring additional images using progressively longer exposure times until the acceptable exposure time is determined.

8. The code reader of claim 1, further including if the motion level is above the predetermined threshold, discarding the first image and acquiring a new image.

9. The code reader of claim 1, wherein the code reader is a handheld code reader.

10. The code reader of claim 1, further including associating detected motion data with each of a plurality of acquired images.

11. The code reader of claim 1, further including:
determining detected motion data is below a predetermined detected motion data threshold; and
instructing the image acquisition system to acquire a plurality of images when the detected motion is below the predetermined threshold.

12. The code reader of claim 1, further including determining if image decoding is in process on the first image.

13. A method for use with a code reader, the method comprising:
providing an image acquisition system, the image acquisition system acquiring low resolution images and high resolution images, and acquiring a brightness level for at least one of the low resolution images and high resolution images;
providing a sensor detecting motion of the code reader;
providing a processor operatively coupled to the image acquisition system and the sensor, the processor performing the steps of:
instructing the image acquisition system to acquire a first image at a first exposure time;
determining if a brightness level of the first image at the first exposure time provides an acceptable exposure time for image decoding;
determining if a motion level of the code reader is above or below a motion level threshold, the motion level threshold based on the acceptable exposure time;
when the motion level of the code reader is below the motion level threshold, and when the exposure time provides the acceptable exposure time, determining if the first image is a low resolution image or a high resolution image; and
if the first image is a high resolution image, attempting to decode the high resolution image.

14. A system comprising:
an image acquisition system, the image acquisition system to acquire a plurality of images;
a sensor to detect motion of the image acquisition system; and
a processor operatively coupled to the image acquisition system and the sensor, the processor to perform the steps of:
instructing the image acquisition system to acquire a first image at a first exposure time, wherein the first image has a first resolution;
determining if a brightness level of the first image at the first exposure time provides an acceptable exposure time for image decoding;
determining if a motion level of the image acquisition system during acquisition of the first image is above or below a motion level threshold, the motion level threshold based on the acceptable exposure time;
when the motion level of the image acquisition system is below the motion level threshold, and when the first exposure time provides the acceptable exposure time,
determining if the first image is a low resolution image or a high resolution image based on the first resolution;
when the first image is the low resolution image, instructing the image acquisition system to acquire a second image at the first exposure time, wherein the second image has a second resolution that is higher than the first resolution; and
attempting to decode the second image.

15. The system of claim 14, further including:
determining a second motion level of the image acquisition system during acquisition of the second image;
instructing the image acquisition system to acquire a third image at the first exposure time;
comparing a third motion level of the image acquisition system during acquisition of the third image to the motion level of the image acquisition system during acquisition of the second image; and
when the third motion level is preferred compared to the second motion level, aborting the image decoding of the second image.

16. The system of claim 14, further including indicating, during decoding of the second image, at least one of a progress value and a likelihood of successful processing of the second image.

17. The system of claim 16, further including determining if the image decoding of the second image should be aborted based on at least one of the progress value and the likelihood of successful processing.

18. The system of claim 14, further including:
determining if a motion level of the image acquisition system during acquisition of a subsequent image is lower than the motion level of the image acquisition system during acquisition of the second image; and
attempting to decode the subsequent image when the motion level associated with the subsequent image is preferred over the motion level associated with the second motion level.

19. The system of claim 14, further including:

determining if a motion level of the image acquisition system during acquisition of a subsequent image is preferred to the motion level associated with the second image; and continuing image decoding of the second image if the motion level associated with the subsequent image is not preferred.

20. The system of claim 14, further including:

instructing the image acquisition system to acquire a third image at a second exposure time, wherein the third image has the first resolution; and when the second exposure time does not provide the acceptable exposure time, instructing the image acquisition system to acquire the first image at the first exposure time.

* * * * *